United States Patent [19]

Nagano

[11] Patent Number: 4,601,682
[45] Date of Patent: Jul. 22, 1986

[54] DERAILLEUR FOR A BICYCLE
[75] Inventor: Masashi Nagano, Izumi, Japan
[73] Assignee: Shimano Industrial Company Limited, Osaka, Japan
[21] Appl. No.: 574,332
[22] Filed: Jan. 27, 1984
[30] Foreign Application Priority Data Feb. 2, 1983 [JP] Japan .............. 58-14770[U]
Feb. 2, 1983 [JP] Japan .............. 58-14771[U]
May 21, 1983 [JP] Japan .............. 58-76525[U]
May 21, 1983 [JP] Japan .............. 58-76526[U]

[51] Int. Cl.⁴ ........................... F16H 11/08
[52] U.S. Cl. ....................... 474/80; 474/78
[58] Field of Search .................... 474/80-82, 474/78

[56] References Cited
U.S. PATENT DOCUMENTS

Re. 30,524  2/1981  Nagano ................. 474/82
3,402,942   9/1968  Shimano et al. ......... 474/80
4,469,479   9/1984  Ozaki .................. 474/80

FOREIGN PATENT DOCUMENTS 58-53587  3/1983  Japan .

Primary Examiner—Stephen J. Novosad
Assistant Examiner—Thuy M. Bui
Attorney, Agent, or Firm—Stevens, Davis, Miller & Mosher

[57] ABSTRACT

A derailleur for a bicycle, which is operated by a control wire. Between a base member and a movable member a stiff swingable member is positioned and is pivoted to both the members through first and second shafts. A regulator controls the rotation of the movable member with respect to the swingable member so that the movable member is made movable by the swingable member with respect to the base member while the shafts are kept in parallel to each other. The movable member is divided to fixedly sandwich the control wire between the divided segments, thereby ensuring fixing of the wire.

5 Claims, 12 Drawing Figures

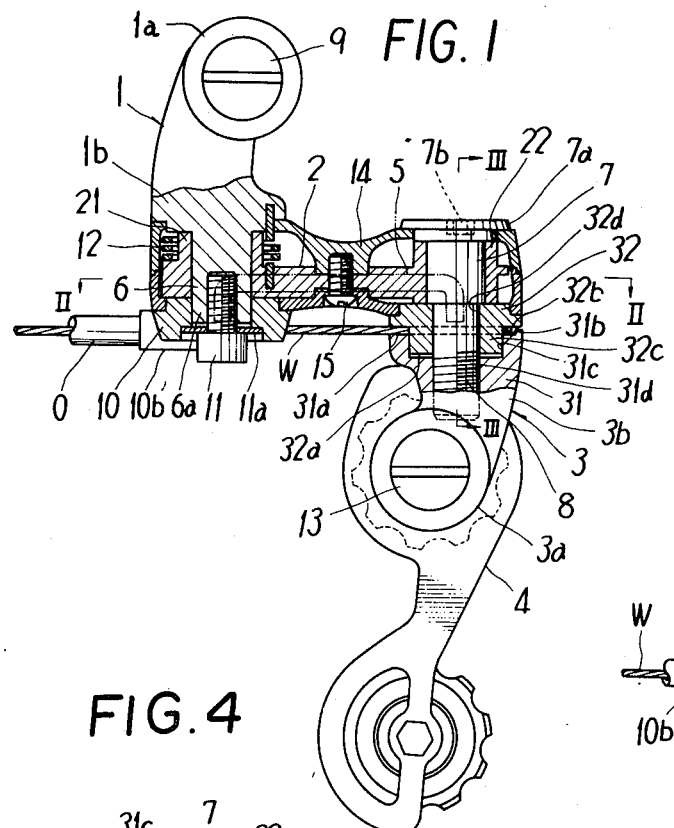
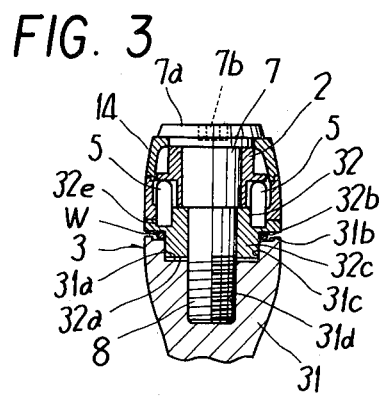
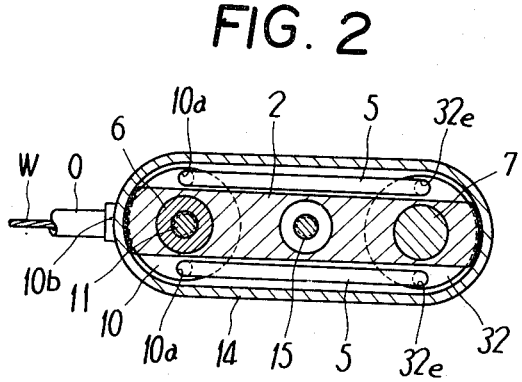
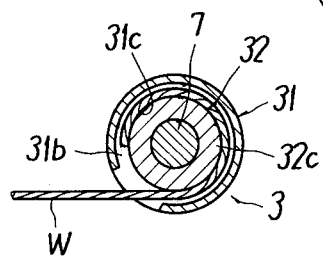
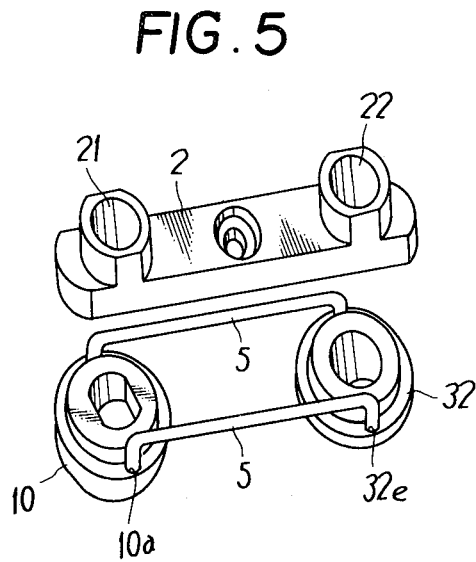
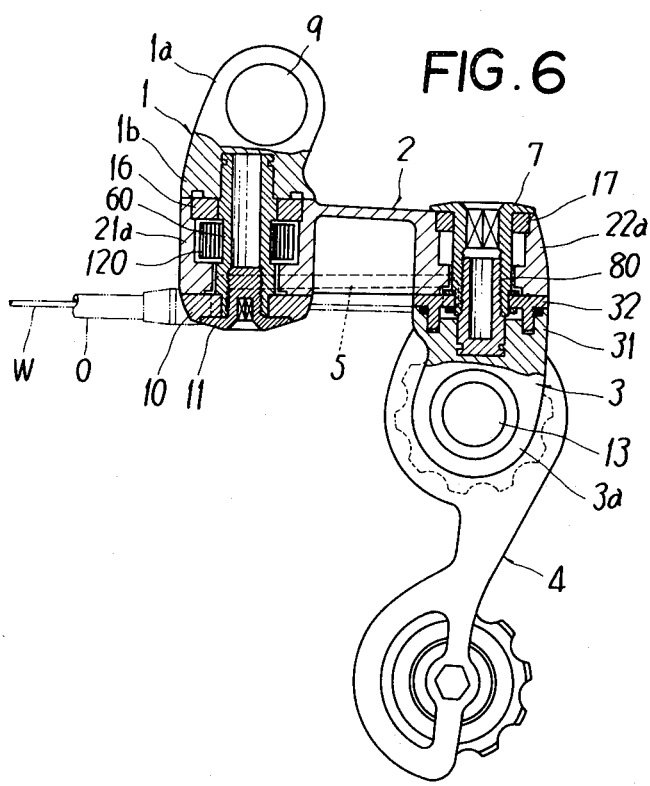

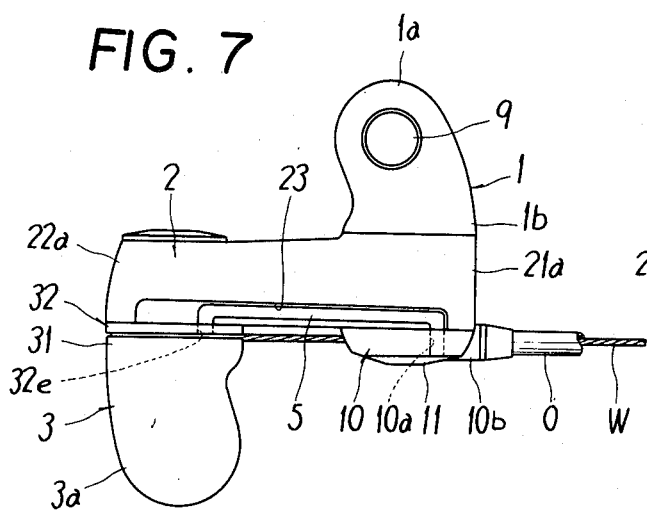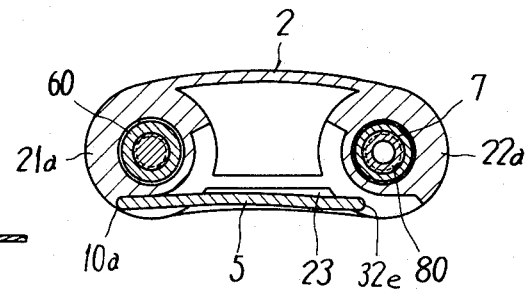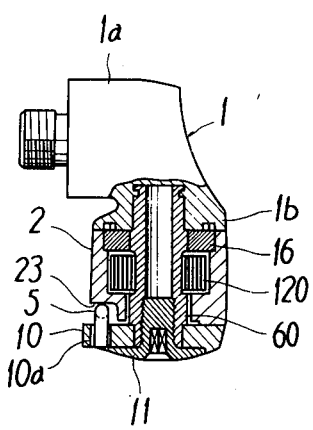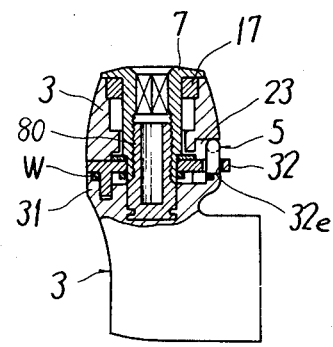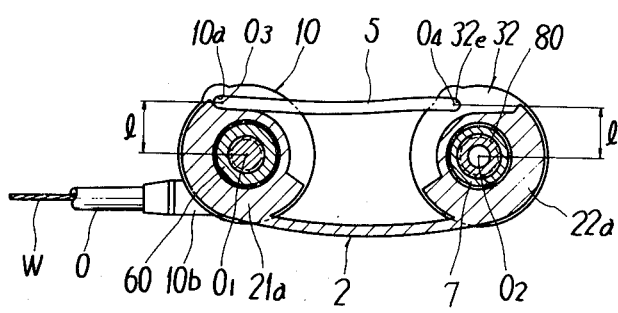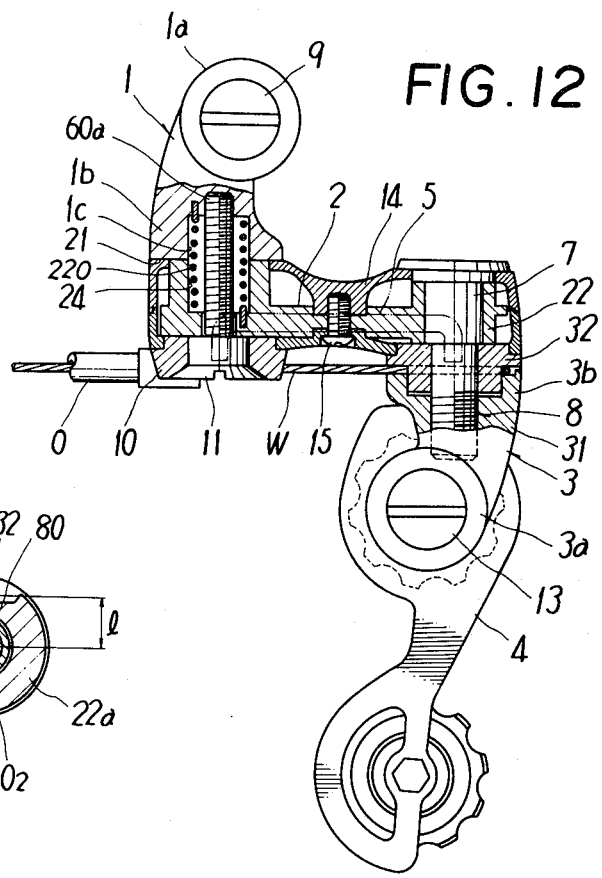

DERAILLEUR FOR A BICYCLE

FIELD OF THE INVENTION

This invention relates to a derailleur for a bicycle, and more particularly, to a derailleur for a bicycle operated by a control wire to switch a driving chain to one of multi-stage sprockets for changing the bicycle speed.

BACKGROUND OF THE INVENTION

Generally, this kind of derailleur basically comprises a pantograph mechanism of four members: a base member, two linkage members and a movable member having a chain guide.

Such a derailleur, however, forms a large space between the four members to result in a bad appearance.

Hence, in the Japanese Patent Laid-Open Gazette No. Sho 58-53,587, a derailleur has hitherto been proposed which interposes between the base member and the movable member one linkage of a box-like shape and having a lid, and contains the other linkage member of a rod-like shape in the aforesaid box-like-shaped linkage member to thereby make a good appearance.

The box-like-shaped linkage member, however, contains therein a crank plate together with the rod-like linkage member retained thereto, so that the latter is difficult to incorporate in the box-like-shaped linkage member. As a result, a problem is created in that the workability for the manufacturing is poor and the manufacturing cost is high.

Furthermore, the conventional derailleur employs one box-like linkage member, but a control wire to actuate the movable member is fixed to the box-like linkage member through a well-known wire-holder which has a tightening screw and projects from the linkage member.

Hence, the wire holder projecting from the box-like linkage member makes an ill appearance and the control wire is tightened by the screw to be insufficient in its fixing length. As a result, even if the screw is fully tightened, the wire, after repeated operations, may escape from the holder due to a weakened fixing strength, and is liable to be broken at the fixing point. Also, the special wire-fixture largely projecting from the linkage member is an obstacle to a cyclist and the derailleur is complicated in construction, large-sized, and expensive to produce.

SUMMARY OF THE INVENTION

In order to solve the above problem, the present invention has been designed. An object of the invention is to provide a derailleur for a bicycle, which uses, instead of the linkage members, one stiff swingable member and one or two regulators, thereby making a good appearance of the derailleur as a whole, facilitating assembly of the components, utilizing the components to fix the control wire without using any special wire-fixture, and enabling the wire to have a length sufficient to be fixed.

The derailleur of the invention comprises a base member, a movable member having a chain guide, a first shaft means related or connected to the base member, a second shaft means related or connected to the movable member, a swingable member of stiffness which allows the movable member to move with respect to the base member while keeping the first and second shaft means in parallel to each other and which provides a first boss supported swingably to the base member through the first shaft means and a second boss supporting the movable member rotatably through the second shaft means, and at least one regulator, which regulates rotation of the movable member with respect to the swingable member, which extends along the swingable member and which is retained at both lengthwise ends to the base member and movable member radially outwardly of the first and second shaft means respectively. At least one of the base member and the movable member is divided radially of the shaft means, the divided segments being opposite to each other at the divided end faces and around the shaft means, and a fixing means is provided between the divided segments so as to fix them, whereby the end of the control wire is fixed between the divided segments.

Accordingly, the derailleur of the invention employs the swingable member to support the movable member and allows the regulator to regulate the rotation of the movable member with respect to the swingable member. Thus, the movable member is movable keeping its posture constant with respect to the base member so as to switch the chain to one of multistage sprockets. Also, the derailleur has the swingable member as the main component to create a good appearance, and employs the swingable member not of a box-like shape and not of containing therein the regulator, whereby the regulator is easy to assemble. Furthermore, the base member or the movable member is divided so that the control wire is fixed between the end faces of the divided segments. This enables the wire to be fixed at a sufficient length without using any special fixture, and eliminates the aforesaid obstacle, thus further making a good appearance of derailleur.

These and other objects of the invention will become more apparent in the detailed description and examples which follow.

BRIEF DESCRIPTION OF THE DRAWINGS

FIG. 1 is a partially cutaway front view of an embodiment of a derailleur of the invention, FIG. 2 is a partially omitted sectional view taken on the line II—II in FIG. 1, FIG. 3 is a sectional view taken on the line III—III in FIG. 1, FIG. 4 is a sectional view of a control wire fixing portion, FIG. 5 is a perspective exploded view of a swingable member and a regulator, FIG. 6 is a longitudinal sectional view of a modified embodiment of the invention, FIG. 7 is a partially omitted rear view of the FIG. 6 embodiment, FIG. 8 is a cross-sectional bottom view thereof, FIG. 9 is a partially omitted cross-sectional view of the same, FIG. 10 is a sectional view around a first pivot shaft, FIG. 11 is a sectional view around a second pivot shaft, and FIG. 12 is a longitudinal sectional front view of another modified embodiment of the invention.

DETAILED DESCRIPTION OF THE INVENTION

Referring to FIG. 1, a rear derailleur which is used together with the rear multistage sprockets is shown, which mainly comprises a base member 1, a swingable member 2 of stiffness, a movable member 3 having a chain guide 4, regulators 5, and a combination of a first shaft means related or connected to the base member 1 and a second shaft means related or connected to the movable member 3.

The base member 1 is fixed together with a rear wheel hub of the bicycle to the frame thereof, or is pivoted through a horizontal shaft to a bracket member (not shown) fixed to the bicycle frame. Base member 1 comprises tubular mounting portion 1a for mounting the base member 1 to the frame or the bracket member and a trunk 1b extending downwardly from one side of mounting portion 1a as shown in FIG. 1. Mounting portion 1a is fixed to, for example, the bicycle frame through a horizontal shaft 9 parallel to the axis of the multistage sprocket assembly. In the FIG. 1 embodiment, a pivot shaft 6 constituting the first shaft means projects integrally from the end face of trunk 1b, and the swingable member 2 is supported at one end thereof rotatably around the first pivot shaft 6. A cylindrical outer-sheath-holder 10 is supported not rotatably on the outer periphery of the utmost end of first pivot shaft 6, and a lock member 11 screws with a threaded bore at the center of pivot shaft 6 to thereby prevent the swingable member 2 from falling down.

The outer sheath holder 10 is formed in a disc having a central through-bore, fitted therethrough not-rotatably to a not-round end 6a of first pivot shaft 6. Holder 10 is provided with bores 10a engageable with one of the ends of regulators 5 and shifting from the center of holder 10. Holder 10 also has at one side of its outer periphery a socket 10b for retaining one end of the outer sheath O guiding a control wire W.

The lock member 11 employs, for example, a headed bolt and a washer 11a as shown, and may alternatively use a snap ring or a nut, which is not particularly defined. In brief, the lock member 11 need only be capable of preventing a first boss 21 of swingable member 2 and the outer sheath holder 10 from escaping from the first pivot shaft 6.

The swingable member 2 allows the movable member 3 to move while keeping the shaft means in parallel with respect to the base member 1, and is made from, for example, an aluminum alloy or synthetic resin, of a given stiffness. Swingable member 2 is provided at both lengthwise ends with a first boss 21 and a second boss 22 as shown in FIG. 5. The first boss 21 is fitted onto the first pivot shaft 6 to support the swingable member 2 swingably to the base member 1, and a second pivot shaft 7, constituting the second shaft means, is fitted into the second boss 22 to support the movable member 3 rotatably to the swingable member 2.

Also, the swingable member 2 shown in FIGS. 1 and 5 is formed in a thick plate member, and the first and second bosses 21 and 22 project cylindrically therefrom. A coiled return spring 12 is wound around the first boss 21 and is retained at one end to the trunk 1b at the base member 1 and at the other end to the swingable member 2.

The movable member 3 is similar in shape to the base member 1 and comprises a cylindrical mounting portion 3a, and a trunk 3b extending upwardly from one side surface of mounting portion 3a. Mounting portion 3a supports the chain guide 4 rotatably in a given range through a horizontal shaft 13 extending in parallel to the horizontal shaft 9 at the base member 1. The trunk 3b of movable member 3 is divided at the upper portion into first and second divided segments 31 and 32. First divided segment 31 is provided circumferentially of the end face 31a with an annular wire-receiving face 31b and at the radially inside thereof with a recess 31c and a threaded bore 31d. At the divided end face 32a of second divided segment 32 are provided an annular wire-pressing face 32b opposite to the wire-receiving face 31b, a projection 32c to be fitted into the recess 31c, and a central through-bore 32d. Accordingly, wire-receiving face 31b and wire-pressing face 32b put therebetween one end of control wire W curved in part around the projection 32c, thereby fixing the curved wire W end by use of a fixing means.

The second pivot shaft 7 employs a shaft having at one end a head 7a and a rotary control 7b and at the utmost end a screw thread 8 used as the aforesaid fixing means. Second pivot shaft 7 is fitted into the second boss 22 of swingable member 2 and into the through-bore 32d at the second divided segment 32 and also screws at the screw thread 8 with the threaded bore 31d, thereby fixing the divided segments 31 and 32, securing the wire W therebetween and also supporting the movable member 3 rotatably to the swingable member 2.

Regulators 5, as shown in FIGS. 2 and 5, employ two wire rods bent at both ends respectively and are retained at both the bent ends to engaging portions 10a provided at the outer sheath holder 10 and to engaging portions 32e at the second divided segment 32.

The derailleur constructed as abovementioned has a cover 14 which is box-like-shaped and hollow for covering the swingable member 2 to prevent it from being splashed with mud or exposed to rain water. The box-like-shaped cover 14, as shown in FIG. 1, is divided in two at a vertically intermediate portion and is connected by a set screw 15 inserted through a bore provided at an intermediate portion of swingable member 2.

The control wire W is fixed to the derailleur such that the screw thread 8 at the second pivot shaft 7 is screwed backwardly through the control 7b to produce a gap between the first and second divided segments 31 and 32. Control wire W is inserted between the wire-receiving face 31b at the segment 31 and the wire-pressing face 32b at segment 32. The end of wire W is curved along the outer periphery of projection 32c at the second divided segment 32, and the screw thread 8 is screwed forwardly to secure the wire W between the wire-receiving face 31b and the wire-pressing face 32b. Thus, the wire W fixed at the bent end around the projection 32c, and in turn the second pivot shaft 7, can increase its pinched area and be prevented from escaping which otherwise might be caused by repeated operations. Also, the large pinched area can disperse a pinching force acting on the wire to thereby prevent breakage of wire W at its pinched portion.

When the control wire W is pulled, a distance between the wire mounting position at the movable member 3 and the outer sheath socket 10b is reduced in order to swing the swingable member 2 with respect to the base member 1 against the return spring 12 and the regulators 5 swing in association with the swingable member 2. Hence, the movable member 3 swings around the supporting position of swingable member 2 to the base member 1, whereby the chain guided by the chain guide 4 is switched, for example, from a smaller diameter sprocket to a larger diameter one at the multistage sprocket assembly. When the pulled wire W is released, the swingable member 2 and regulators 5 swing to restore by means of the return spring 12, and the movable member 3 returns to switch the chain from the larger diameter sprocket to the smaller diameter one.

Alternatively, the base member 1 may be divided in two axially of first pivot shaft 6 to secure the wire W between the divided segments. In this case, the outer sheath O is attached to the movable member 3. Also, the movable member 3 or base member 1 may alternatively be divided into three, in which case the wire W may be secured between the two divided segments.

Alternatively, the first pivot shaft 6 may be separate from the base member 1 as shown in FIG. 6. Also, a screw member 80 separate from the second pivot shaft 7 may be used as the foresaid fixing means and may be fixed to the movable member 3 as shown in FIG. 6. Also, the second pivot shaft 7 may be integral with, for example, the first divided segment 31, and may be provided at the center of its utmost end with a threaded bore so that a screw member, such as a bolt, may be screwed with the threaded bore. Second pivot shaft 7 may also be provided at the outer periphery of its utmost end with a screw thread, with which a nut screws to fix the segments 31 and 32, thus not particularly defining the aforesaid fixing means. Also, in a case where the base member 1 is divided, the fixing means can be constructed the same as abovementioned.

Also, the regulators 5 may alternatively be one as shown in FIGS. 6 through 9.

In greater detail, the embodiment shown in FIGS. 6 through 11 is so constructed that the swingable member 2 is formed in a box-like shape downwardly open and provided at both lengthwise ends with first and second cylindrical bosses 21a and 22a. First boss 21a is fitted onto a first pivot shaft 60 separate from the base member 1. Outer sheath holder 10 is fitted not-rotatably onto the axial end of first pivot shaft 60. Lock member 11 screws therewith to support the swingable member 2, and a screw member 80 separate from the second pivot shaft 7 screws therewith to secure the control wire W between the divided segments 31 and 32. A single regulator 5 engages with one engaging portion 10a at the outer sheath holder 10 and one engaging portion 32e at the second divided segment 32. Regulator 5, as shown in FIG. 7, is sandwiched between the swingable member 2, the outer sheath holder 10, and the divided segment 32, thereby being prevented from escaping from the engaging portions 10a and 32e.

Also, in FIGS. 6 through 11, the swingable member 2 is provided at the side surface of the lower portion thereof with an elongate recess 23 extending across the first and second bosses 21a and 22a, and the regulator 5 is disposed in the recess 23 to thereby be prevented from escaping and from being viewed from the front and upper sides of the derailleur.

Also, in this embodiment, sealing rings 16 and 17 of synthetic resin are interposed between the end face of trunk 1b at the base member 1 and the first boss 21a and between the second pivot shaft 7 and the second boss 22a of swingable member 2. Additionally, spiral return spring 120 is wound around the first pivot shaft 60.

Thus, in the embodiment shown in FIGS. 6 through 11, the derailleur makes a good appearance as a whole, prevents the wire from being splashed at its exposed portion with mud, and retains both ends of regulator 5 disposed laterally outwardly of swingable member 2, to the outer sheath holder 10 and divided segment 32. As a result, assembly of regulator 5 is facilitated. Also, since the regulator 5 is retained to both the outer sheath holder 10 and divided segment 32 not to be restricted by the swingable member 2, pitches l between the centers $O_1$ and $O_2$ of first and second bosses 21a and 22a and the retaining centers $O_3$ and $O_4$ of regulator 5 can be made sufficiently large as shown in FIG. 9. Hence, during the movement of movable member 3 for changing the bicycle speed, the bending moment acting on the regulator 5 is reducible more than the predetermined value, thereby enabling the use of a regulator of less durability to that extent.

Alternatively, the regulators 5 in the aforesaid two embodiments, may be retained directly to the base member 1 and movable member 3; to members other than the outer sheath holder 10 and divided segment 32, and fixed to the base member 1 and movable member 3; to the base member 1 and a member fixed to the movable member 3; or to the movable member 3 and a member fixed to the base member 1.

Also, the return springs 12 and 120 may alternatively be wound around the second bosses 22 and 22a and retained to the swingable member 2 and movable member 3 respectively.

Furthermore, a coiled return spring 220, as shown in FIG. 12, may be contained within recesses 1c and 24 provided at the base member 1 and swingable member 2, thereby making its coil length sufficiently large to improve the durability.

In this case, the first pivot shaft designated by reference numeral 60a is preferably separate from the base member 1 and screwably fixed thereto.

Although the invention has been described with reference to several embodiments, these embodiments are merely exemplary and not limiting of the invention, which is defined solely by the appended claims.

What is claimed is:

1. A derailleur for a bicycle which is operated by a control wire to change the bicycle speed, comprising:
   a base member,
   a movable member having a chain guide,
   a first shaft means associated with said base member,
   a second shaft means associated with said movable member,
   a stiff swingable member for allowing said movable member to move with respect to said base member while keeping each of said shaft means parallel to each other and including a first boss supported swingably to said base member by said first shaft means and a second boss for supporting said movable member rotatably by means of said second shaft means, and
   at least one regulator for regulating rotation of said movable member with respect to said swingable member, said at least one regulator extending lengthwise of and along an outside extremity of said swingable member and being retained at both lengthwise ends radially outwardly relative to said first and second shaft means,
   at least one of said base member and said movable member being divided into divided portions axially of said first shaft means and said second shaft means respectively, divided end faces of said divided portions being disposed opposite to each other around one of said first and second shaft means, a fixing means for fixing said divided portions being disposed between said divided portions, said control wire including a terminal portions at which said control wire is secured between said divided portions of one of said base member and said movable member.

2. A derailleur for a bicycle according to claim 1, wherein said first shaft means includes a lock member for said swingable member supported swingably by said first shaft means, said drailleur comprising a holder for an outer sheath for guiding said control wire, said holder being fitted onto said first shaft means and held by said lock member.

3. A derailleur for a bicycle according to claim 1, wherein said regulator comprises at both lengthwise ends thereof retaining portions so that at least one of said retaining portions is sandwiched between said swingable member and said movable member supported thereto.

4. A derailleur for a bicycle according to claim 1 wherein said movable member is divided into divided portions axially of said second shaft means, and divided end faces of said divided portions of said movable member are opposite to each other around said second shaft means.

5. A derailleur for a bicycle according to claim 1, further comprising an outer sheath holder for supporting an outer sheath for guiding said control wire, said outer sheath holder being mounted on one of said base member and said movable member which does not have said terminal portion of said control wire secured between divided portions thereof.

* * * * *